United States Patent [19]

Montenegro et al.

[11] Patent Number: 5,694,537
[45] Date of Patent: Dec. 2, 1997

[54] NETWORK DEVICE WHICH SELECTS A TIME SERVICE PROVIDER

[75] Inventors: Elias Montenegro, Mission Viejo; Robert D. Wadsworth, Costa Mesa; Lorraine F. Barrett, Yorba Linda, all of Calif.

[73] Assignee: Canon Information Systems, Inc., Costa Mesa, Calif.

[21] Appl. No.: 509,582

[22] Filed: Jul. 31, 1995

[51] Int. Cl.⁶ ............................................. G06F 11/00
[52] U.S. Cl. ............................... 395/182.1; 395/200.19
[58] Field of Search ........................... 395/180, 182.1, 395/200.1, 200.05, 200.08, 200.14, 200.19, 285, 284, 291, 292, 293, 294, 295, 296, 297, 299, 301, 550, 182.09, 553, 556; 375/356, 357

[56] References Cited

U.S. PATENT DOCUMENTS

| | | | |
|---|---|---|---|
| 4,683,531 | 7/1987 | Kelch et al. | 364/200 |
| 4,763,323 | 8/1988 | Nelson et al. | 370/96 |
| 4,894,846 | 1/1990 | Fine | 375/107 |
| 5,014,221 | 5/1991 | Mogul | 364/900 |
| 5,081,576 | 1/1992 | Ward | 395/289 |
| 5,130,983 | 7/1992 | Heffner III | 395/725 |
| 5,276,861 | 1/1994 | Howarth | 395/575 |
| 5,301,283 | 4/1994 | Thacker et al. | 395/325 |
| 5,323,393 | 6/1994 | Barrett et al. | 370/85.8 |
| 5,327,468 | 7/1994 | Edblad et al. | 375/107 |
| 5,349,643 | 9/1994 | Cox et al. | 380/25 |
| 5,381,534 | 1/1995 | Shi | 395/200 |
| 5,390,326 | 2/1995 | Shah | 371/20.6 |
| 5,428,645 | 6/1995 | Dolev et al. | 375/354 |
| 5,440,744 | 8/1995 | Jacobson et al. | 395/650 |
| 5,471,631 | 11/1995 | Beardsley et al. | 395/650 |
| 5,519,883 | 5/1996 | White et al. | 395/200.2 |
| 5,526,492 | 6/1996 | Ishida | 395/200.09 |
| 5,537,626 | 7/1996 | Kraslavsky et al. | 395/200.02 |

*Primary Examiner*—Robert W. Beausoliel, Jr.
*Assistant Examiner*—Joseph E. Palys
*Attorney, Agent, or Firm*—Fitzpatrick, Cella, Harper & Scinto

[57] ABSTRACT

A method of selecting one time service provider from a plurality of time service providers accessible over a local area network (LAN). The method includes a storing step which stores, in a memory, a list identifying plural time service providers accessible over the LAN, the list identifying plural time service providers in order from a highest priority time service provider to a lowest priority time service provider. A determining step determines, via a LAN interface, a highest priority time service provider which is available in the list identifying plural time service providers, and a selecting step selects, via the LAN interface, the highest priority time service provider which is available in the list identifying plural time service providers.

25 Claims, 8 Drawing Sheets

TIME SERVICES INFORMATION

TIME SERVICE PROVIDER PRIORITY:

1. IPX

2. TCP/IP

3. APPLETALK

TIME UPDATE INTERVAL (SECONDS): 120

NETWORK DEVICE WHICH SELECTS A TIME SERVICE PROVIDER

BACKGROUND OF THE INVENTION

1. Field of the Invention

The present invention relates to a network device which interfaces to a network, over which plural time service providers are accessible, and which selects one of those time service providers.

2. Description of the Related Art

Conventional network devices which interface to a local area network (LAN) receive time data, comprising the current time and date, from a predetermined time service provider on the LAN.

Oftentimes, however, the predetermined time service provider for such a conventional network device may become unavailable, for example, due to operational errors, disconnection from the LAN, and the like. In such cases, the network device will be unable to obtain the current time. As a result, the network device will not be able to maintain accurate time. In some cases, unavailability of a predetermined time service provider can even result in inoperability of the network device if the network device has no other means by which to obtain time.

In some networks, multiple time service providers are available. Particularly in the case of heterogeneous networks, for example, there is often a separate time service provider for each different network protocol (such as IPX, TCP/IP or AppleTalk) running on the heterogeneous network. The availability of multiple time service providers provides the opportunity for the network device to select an alternate time service provider if a primary time service provider becomes unavailable.

What is still needed, however, is a technique for deciding which of the multiple time service providers should be selected, as well as a technique for ensuring that the primary time service provider is re-selected if it later becomes available.

SUMMARY OF THE INVENTION

The foregoing need is addressed by the present invention, which is a network device that stores a list identifying plural time service providers accessible over a LAN in order of priority, and which, at predetermined time intervals, determines the highest priority time service provider in the list that is available and selects that time service provider. Because the network device determines availability of time service providers and selects the highest priority time service provider which is available, the network device is able to access time data even if one or more time service providers in the list become unavailable. Moreover, because determination and selection are repeated at predetermined time intervals, such as every 2 minutes, it is possible to ensure that the primary time service provider is re-selected if it later becomes available.

According to one aspect, the present invention selects one time service provider from a plurality of time service providers accessible over a local area network (LAN). A list identifying plural time service providers accessible over the LAN is stored in a memory. The list identifies plural time service providers in order from a highest priority time service provider to a lowest priority time service provider. A highest priority time service provider which is available in the list identifying plural time service providers is determined via a LAN interface, and the highest priority time service provider which is available in the list identifying plural time service providers is selected via the LAN interface.

Because the present invention selects a highest priority time service provider that is available from a list of plural time service providers, the present invention is able to access time data even if other time service providers on the list of plural time service providers are unavailable. Thus, for example, if a primary timer service provider becomes unavailable, the present invention can access time data from succeeding time service providers in the list.

According to another aspect, the present invention is a network device which interfaces a local area network (LAN) to a peripheral, and which receives print jobs over the LAN, logs the print jobs and communicates the print jobs to the peripheral. The network device includes a memory which stores a list identifying plural time service providers accessible over the LAN, the list identifying plural time service providers in order from a highest priority time service provider to a lowest priority time service provider, and a LAN interface which interfaces to the LAN, over which requests for time data are communicated to a time service provider, over which time data from a currently-available time service provider is received, and over which print jobs are received. Also included in the network device is a peripheral interface which interfaces to the peripheral, over which print jobs are transmitted, and over which peripheral information is received. A processor (a) determines a highest priority time service provider that is available in the list identifying plural time service providers by successively requesting time data, via the LAN interface, from time service providers in the list identifying plural time service providers in order of priority, (b) receives time data from a highest priority time service provider that is available in the list identifying plural time service providers, (c) extrapolates current time data based on the received time data, (d) receives a print job via the LAN interface, (e) communicates the print job to the peripheral via the peripheral interface, (f) logs, in a log file, the print job and time data corresponding to a time that the print job is communicated to the peripheral, (g) receives, via the peripheral interface, a signal indicating that the print job communicated to the peripheral has finished printing, and (h) logs, in the log file, the print job and time data corresponding to the time that the signal indicating that the print job communicated to the peripheral has finished printing is received.

Because the present invention receives time data from a highest priority time service provider in a list of plural time service providers, and current time data based on the received time data, the present invention is able to more accurately log print jobs going to and from the network device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 5 comprised of FIGS. 5A, 5B and 5C, is a flow diagram showing process steps of the present invention for selecting a time service provider from a LAN having plural timer service providers.

DETAILED DESCRIPTION OF THE PREFERRED EMBODIMENT

The present invention is embodied in a network device which is capable of receiving and processing data from the network and of transmitting data to the network. Such a device can include a network interface device which interfaces a peripheral to the network, or even the peripheral itself.

[Network Architecture]

Figure 1:
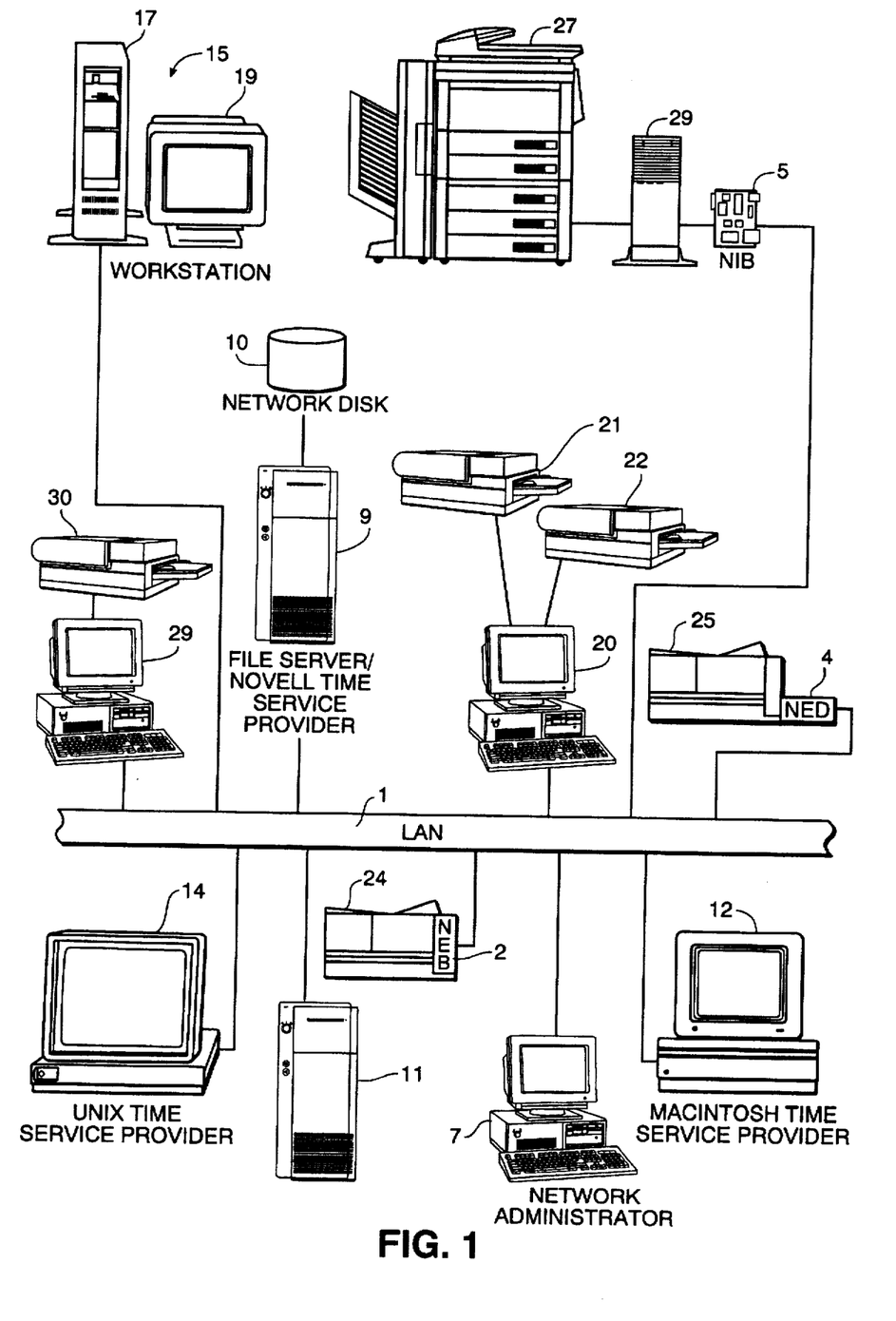
FIG. 1 is a diagram of a LAN which includes network devices that embody the present invention.

FIG. 1 is a diagram of heterogeneous LAN 1, which includes network devices that embody the present invention. These network devices include network expansion board (NEB) 2 and network expansion device (NED) 4 (examples of which are described in co-pending U.S. patent application Ser. No. (08/409,116), filed Jun. 9, 1995, entitled "Output-ting a Network Device Log File") and network interface board (NIB) 5 (an example of which is described in U.S. patent application Ser. No. 08/409,034, filed Mar. 23, 1995, entitled "Network Interface Board For Digital Copier").

Typically, a LAN such as LAN 1 services a fairly localized group of users such as a group of users on one floor or contiguous floors of a building. As users become more remote from one another, for example, in different buildings or different states, a wide area network (WAN) (not shown) may be created which is essentially a collection of several LANs all connected by high speed digital lines, such as high speed integrated services digital network (ISDN) telephone lines. Each LAN in a WAN includes its own workstations, and each LAN ordinarily includes its own file server and print server, although this is not necessarily the case.

In FIG. 1, LAN 1 is depicted as an Ethernet medium which has a bus-type architecture, but a Token-ring medium having a ring-type architecture can be used as well. Connected to LAN 1 are personal computer (PC) 7, which serves as a network administrator's computer; file server 9, which serves as a Novell time service provider and which allows shared access to network disk 10; file server 11, which may serve as an additional Novell time service provider; Macintosh computer 12, which serves as a Macintosh time service provider; UNIX workstation 14, which serves as a UNIX time service provider; workstation 15, which may serve as an additional time service provider, such as a LAN MANAGER time service provider, and which includes control unit 17 and display 19; and PC 20, which may serve as a print server for printers 21 and 22. In LAN 1, NEB 2 allows shared access to printer 24, NED 4 allows shared access to printer 25, and NIB 5 allows shared access to copier 27 via multiple device controller (MDC) 29.

Time service providers 9, 12 and 14, upon request, provide a network device, such as NEB 2, NED 4 and NIB 5, as well as any other peripheral on LAN 1, time data comprising the current time and the current date. As shown in FIG. 1, each protocol running on the network has its own time service provider, and some protocols may have more than one time service provider.

In general, a time service provider may be any network peripheral, such as a PC or a file server, so long as the peripheral is capable of transmitting time data in response to a request.

As indicated above, the present invention may be embodied in any network device, such as NEB 2, NED 4 and NIB 5 mentioned above. Additionally, the present invention may be embodied in a network peripheral, such as PC 29.

A preferred embodiment of the present invention is described below in the context of NEB 2 having access to Novell time service provider 9, Macintosh time service provider 12, and UNIX time service provider 14. However, as noted above, the present invention may be embodied in a network device having access to any number of time service providers, which may include, for example, a LAN MANAGER time service provider and/or secondary time service providers for each protocol.

[NEB Architecture]

Broadly speaking, NEB 2 is an interactive network device which couples printer 24 to LAN 1, making printer 24 a responsive and interactive network member. NEB 2 receives print data, status requests, and control commands from LAN 1, transmits print data, status requests, and control commands to printer 24 for execution, and transmits status information back to LAN 1. Thus, NEB 2 can perform not only remote printer services and print server functionalities, but can also offer to network members whatever status and control features are available from the peripheral interface.

Figure 2:
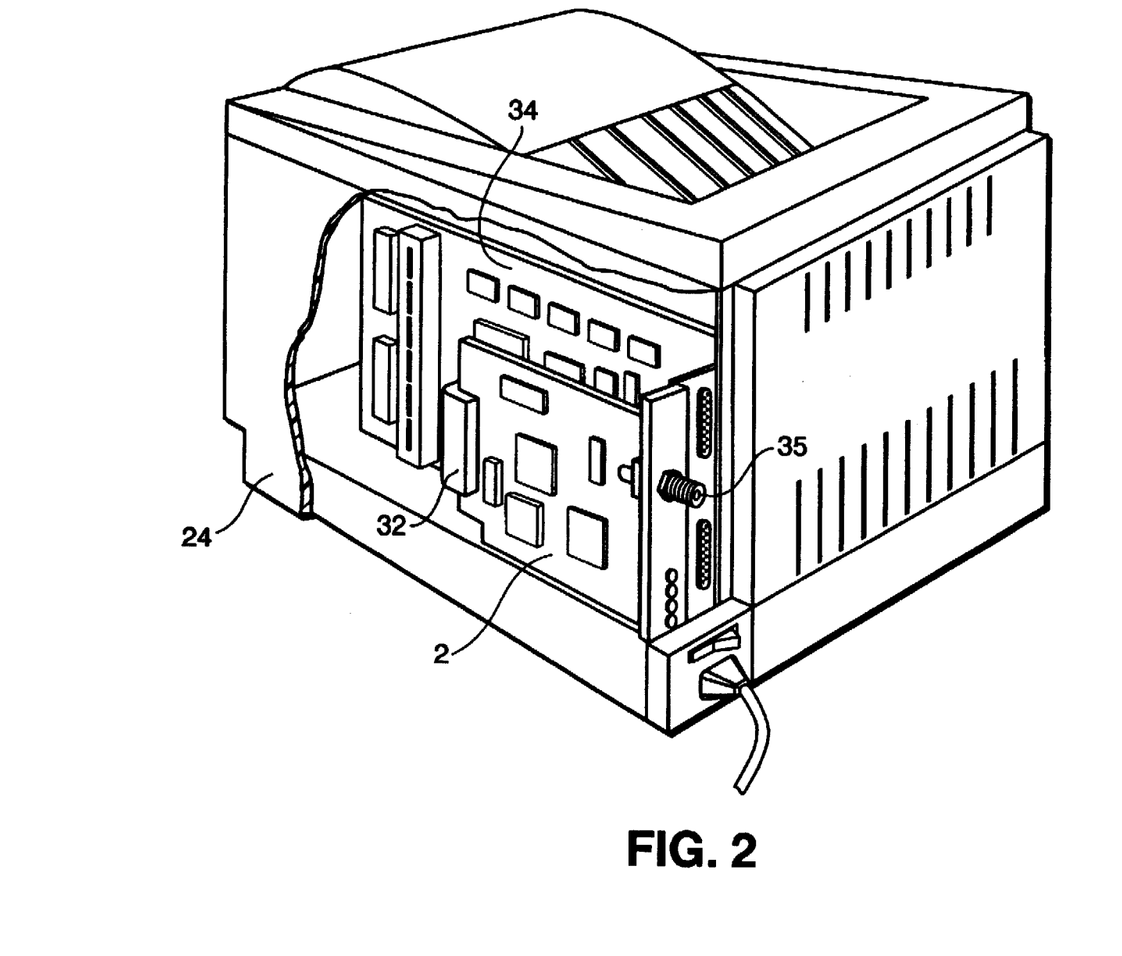
FIG. 2 is a cut away perspective view of a network device which embodies the present invention fitted into a Canon LBP 1260 laser printer.

FIG. 2 is a cut-away perspective view showing installation of NEB 2 into printer 24. As shown in FIG. 2, NEB 2 is preferably housed in an internal expansion I/O slot of printer 24, which in a preferred embodiment of the present invention is a Canon LBP 1260 laser printer. This makes NEB 2 an embedded network node having the processing and data storage features described below.

As also shown in FIG. 2, NEB 2 is connected via peripheral connector 32 to printer interface card 34. Printer interface card 34 directly controls the print engine in printer 24. Print data and printer status commands are fed to printer interface card 34 from NEB 2 via peripheral connector 32, and printer status information and statistics, e.g., number of pages printed, signals indicating end times of print jobs, etc., are obtained from printer interface card 34 also via peripheral connector 32. NEB 2 communicates this information onto LAN 1 via LAN connector 35. LAN connector 35 may be either a BNC connector, an RJ-45 connector, or their equivalent. A BNC connector is shown in FIG. 2.

Figure 3:
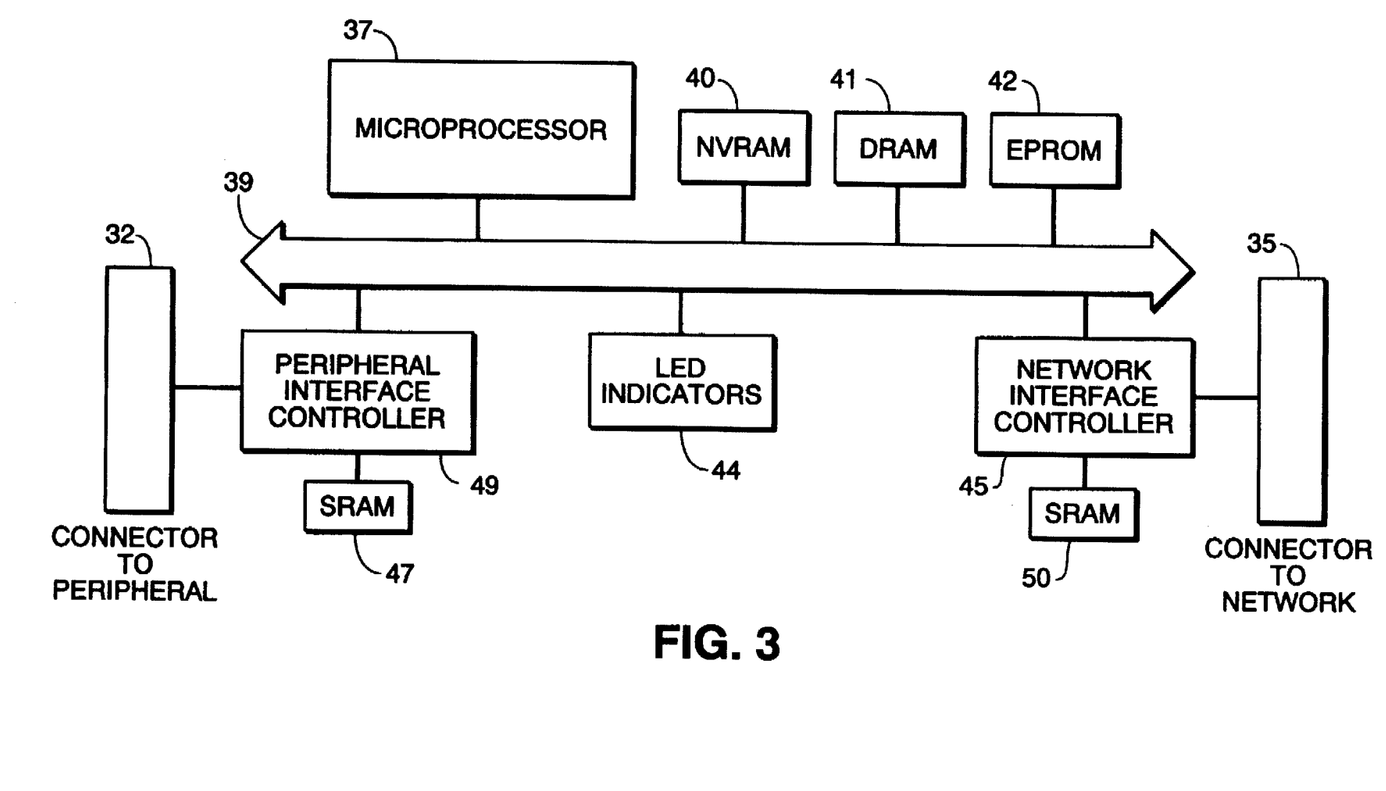
FIG. 3 is a block diagram showing the architecture of a network device which embodies the present invention.

A block diagram of a suitable hardware construction for NEB 2 is shown in FIG. 3. As shown in FIG. 3, NEB 2 includes a central processing unit (CPU) 37, such as an Intel 80C188EA-20 8-bit programmable microprocessor, which is interfaced to computer bus 39. Also interfaced to computer bus 39 is non-volatile RAM (NVRAM) 40, dynamic RAM (DRAM) 41, and electrically erasable programmable read only memory (EPROM) 42. Configuration parameters and other important information that must be stored between power cycles are stored in NVRAM 40. Process steps for execution by microprocessor 37 are stored in EPROM 42, but in general before the process steps are executed, they are copied from EPROM 42 into DRAM 41 for execution out of DRAM 41. LED indicators 44 are provided so as to give a user a general indication as to the processing status of NEB 2 and may, for example, include indicator LEDs for power and data communication.

As described above, NEB 2 interfaces between LAN 1 and the printer 24, and is therefore provided with LAN connector 35 for connecting to LAN 1 in addition to peripheral connector 32 for connecting to printer 24. Network interface controller 45, which is connected to bus 39 and to network connector 35, provides a hardware interface for capturing and assembling data packets for receipt from and transmission onto LAN 1, and also provides a hardware interrupt to microprocessor 37 so as to signal that LAN data packets have been captured and are available for use by microprocessor 37. Static RAM (SRAM) 50 is provided for network interface controller 45 so as to store, on a temporary basis, such data packets.

On the peripheral side, peripheral interface controller 49, which is connected to bus 39 and peripheral connector 32, provides a peripheral interface between NEB 2 and a peripheral serviced by NEB 2. Peripheral interface controller 49 may be any of a variety of different controllers and can, for example, be constructed in a bi-directional interface (such as with a SCSI interface, an IEEE-1284 interface, a dual port RAM interface, a shared RAM interface, an IrDA (Infrared Data Association) interface, or the like) or a uni-directional interface (such as a standard Centronics RS-232 interface, or the like). Peripheral interface controller 49 is provided with SRAM 47 for temporary storage of data transmitted to and from NEB 2 and the peripheral serviced by NEB 2.

[NEB Software]

Figure 4:
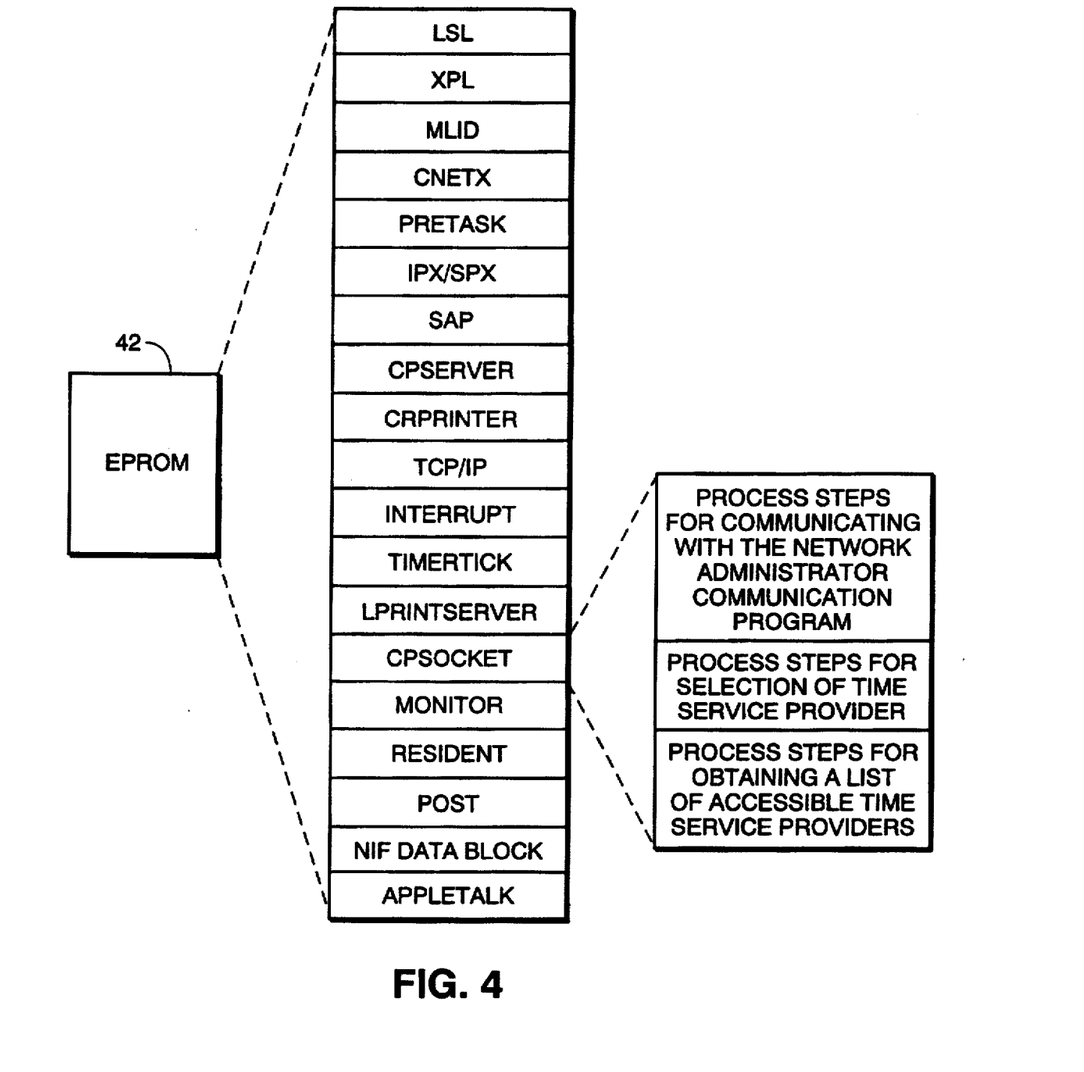
FIG. 4 is a diagram showing examples of software modules stored in EPROM, which are used by the network device.

Software modules executed by microprocessor 37 are stored in EPROM 42. Some low-level modules which are always needed, such as TIMERTICK and NVRAM read, could be executed directly out of EPROM 42, but for the most part, microprocessor 37 does not execute software modules directly from EPROM 42, but rather selectively loads those modules into DRAM 41 for execution from DRAM 41. This permits flexible configuration of NEB 2 by selection of which modules are to be loaded.

FIG. 4 illustrates examples of blocks of code, or software modules, that are stored in EPROM 42. The XPL module provides a standardized interface between printer 24 and NEB 2. MLID (Multi Link Interface Driver) is a piece of Novell code (Media Support Module, or MSM) linked together with a piece of customized code (Hardware Support Module, or HSM) that is the lowest level of network connection, while LSL (Link Support Layer) is a piece of Novell code that acts as a multiplexer between the low level MLID and the several protocol stacks above it. CNETX is customized code that turns local DOS-like function calls into network function calls, providing file functions like OPEN, READ, WRITE, and CLOSE.

The PRETASK module is responsible for identifying what frame types are associated with the various possible protocol stacks. Because NEB 2 supports multiple protocol stacks, this module exists as long as NEB 2 is running.

Novell's IPX/SPX protocol stack is contained in EPROM 42, and is supported by SAP, or Service Advertising Protocol. SAP is a Novell concept that allows devices to register themselves into the file server's bindery, which lists active and inactive network entities. SAP registers NEB 2 via CPSOCKET, and if NEB 2 is configured as a print server, SAP also registers the print server with the NetWare bindery.

CPSERVER is a custom implementation of a Novell print server application. This module provides self-generated print banners, user notification of completion and exception status, and transmission of print data and status commands to the printer. This differs from the Novell print in that CPSERVER is dedicated to driving the local printer (i.e., printer 24 in which NEB 2 is installed) and cannot drive any remote printers. This program owns the print data lines for the duration of a print job. CRPRINTER is a custom implementation of a Novell RPRINTER print application.

This module is an application that is sent data by a Novell print server application elsewhere on LAN 1.

The TCP/IP protocol stack has User Datagram Protocol (UDP), Reverse Address Resolution Protocol (RARP) and BootP support within. INTERRUPT is the interrupt handler for the TCP/IP task, while TIMERTICK is the timer tick for UNIX TCP/IP network tasks. LPRINTSERVER is the TCP/IP print server application, and also owns the print data lines for the duration of a print job.

The AppleTalk protocol stack has a local access protocol (LAP) (not shown) at a data link layer, which forms data packets from data on NEB 2 for transfer onto LAN 1, and datagram delivery protocol (DDP) (not shown) at a network layer, which manages traffic to and from LAN 1.

The CPSOCKET program runs for all protocol stacks. The program responds to requests for connection, requests for data download, or requests for services from remote utilities, and provides status and control to other tasks via interprocess communication. Because CPSOCKET typically owns the status and control lines between NEB 2 and printer 24, it is the only task that has the ability to obtain printer status via the status lines. CPSOCKET is responsible for the network connection and packet contents between the Novell-oriented status and control utilities (CPNET or the corresponding Windows version of client-based software utilities), between the UNIX-oriented status and control utilities (cputil) or between Macintosh-oriented status and control utilities (MPINIT).

As shown in FIG. 4, CPSOCKET contains process steps for communicating with the network administrator's communication program (CPNET or cputil or MPINIT), process steps for selecting a time service provider from a list of plural time service providers and process steps for obtaining a list of accessible time service providers. These process steps in CPSOCKET are responsible for requesting and receiving, at predetermined time intervals, known as "time update intervals", time data from a highest priority time service provider that is available in a list of plural time service providers which ranks the plural time service providers in order of priority from highest priority to lowest priority.

In a preferred embodiment of the present invention, the time update interval and the list of plural time service providers are stored in NVRAM 40. However, it is noted that the time update interval and the list of plural time plural service providers can be stored in any non-volatile storage area, such as EPROM 42, which does not lose its contents upon power-down of NEB 2. It is further noted that the time update interval and the list of plural time plural service providers need not be stored in the same memory.

The time data requested by CPSOCKET comprises the current time and the current date, and is used by CPSOCKET to initialize the time on NEB 2. NEB 2 uses the current time and date to log start and end times of print jobs and the like sent from NEB 2 to its attached peripheral and to log start and end times of print jobs and the like sent from NEB 2 out over LAN 1 in a NEB log file, as described in more detail in U.S. patent application Ser. No. (08/409,116), filed Jun. 9, 1995, entitled "Outputting A Network Device Log File".

Regarding the NEB log file, CPSOCKET creates and maintains a NEB log file which contains information concerning activity of NEB 2 and of printer 24. Such information can include, for example, printer statistics received over peripheral connector 32, number of print jobs sent to printer 24, number of pages printed by printer 24, start and end times of print jobs, and the like. For example, log information can include the time at which the print job is communicated to printer 24 and the time at which printer 24 notifies NEB 2 that the print job has completed printing. Each entry in the log file includes a corresponding time entry. This time entry represents the current time and date, as either received from a time service provider or extrapolated or updated by NEB 2, as described in more detail below.

MONITOR is a customized multi-tasking monitor which performs task creation, task destruction and microprocessor dispatch. MONITOR also has memory management sub-modules MEMGET and MEMFREE. RESIDENT is a block of routines that provides generic services such as read and write to EPROM 42, hardware timer tick, and other basic features. POST is a power-on self-test module that checks the integrity of NEB hardware and software at power-up.

Also stored in EPROM 42 is a network identification file (NIF) data block which stores board-invariant information, which is unique for every network board, hardware configuration data, board revision number and the like, as well as changeable information such as software version number. The information in the NIF data block is used to ensure that EPROM 42 is not reprogrammed with an incompatible firmware image.

[NEB Access and Configuration]

To access information available in NEB 2, a program called CPNET is resident on LAN 1 (in a Unix environment, cputil takes the place of CPNET and, in a Mcintosh environment, MPINIT takes the place of CPNET), usually in a public directory, which can be accessed by the network administrator and which allows the network administrator to access information contained in NEB 2. The CPNET program is capable of interfacing with NEB 2 (and other network members) and of performing such functions as displaying current information for a selected network device (interface information, control information, configuration information and statistics). CPNET may also activate or deactivate applications of NEB 2.

CPNET can also be used to change, from a remote network node, the time update interval and the order of priority of time service providers in the list of plural time service providers. As described in more detail below, using CPNET, the network administrator can remotely access the list of plural time service providers and time update interval stored on NEB 2, and he/she can change the order of priority of time service providers and/or the time update interval as desired. Since, in the preferred embodiment, this the configuration information is stored in NVRAM 40, this information is retained across power cycles.

CPNET communicates with NEB 2 through a special connection with CPSOCKET using a customized client socket. Multiple connections with CPSOCKET are supported. CPSOCKET provides client service transactions such as NEB control, device information, basic configuration information, application information, statistics, and logging. For example, CPNET can request that an application be configured or request that an already-configured application be activated or deactivated. CPSOCKET will insure that the appropriate option (protocol stack) is available and configured for an application before allowing the application itself to be configured. Within NEB 2, the CPSOCKET operational module is always activated.

As indicated above, CPSOCKET is the customized NEB-embedded software which permits peripheral status and control information to be communicated to LAN 1. CPSOCKET runs on NEB 2 and monitors LAN 1 for communications addressed to both NEB 2 and printer 24. Specifically, CPSOCKET communicates with CPNET when it is running. CPSOCKET will also be responsible for the configuration of NEB 2. Further, CPSOCKET will configure and activate applications on NEB 2 at the request of CPNET. CPSOCKET also insures that the correct protocol stacks are available for each configured application. CPSOCKET further handles the settings of NEB 2, such as changing the order of priority of time service providers and the time update interval.

[Selecting A Time Service Provider]

Figures 5, 5A:
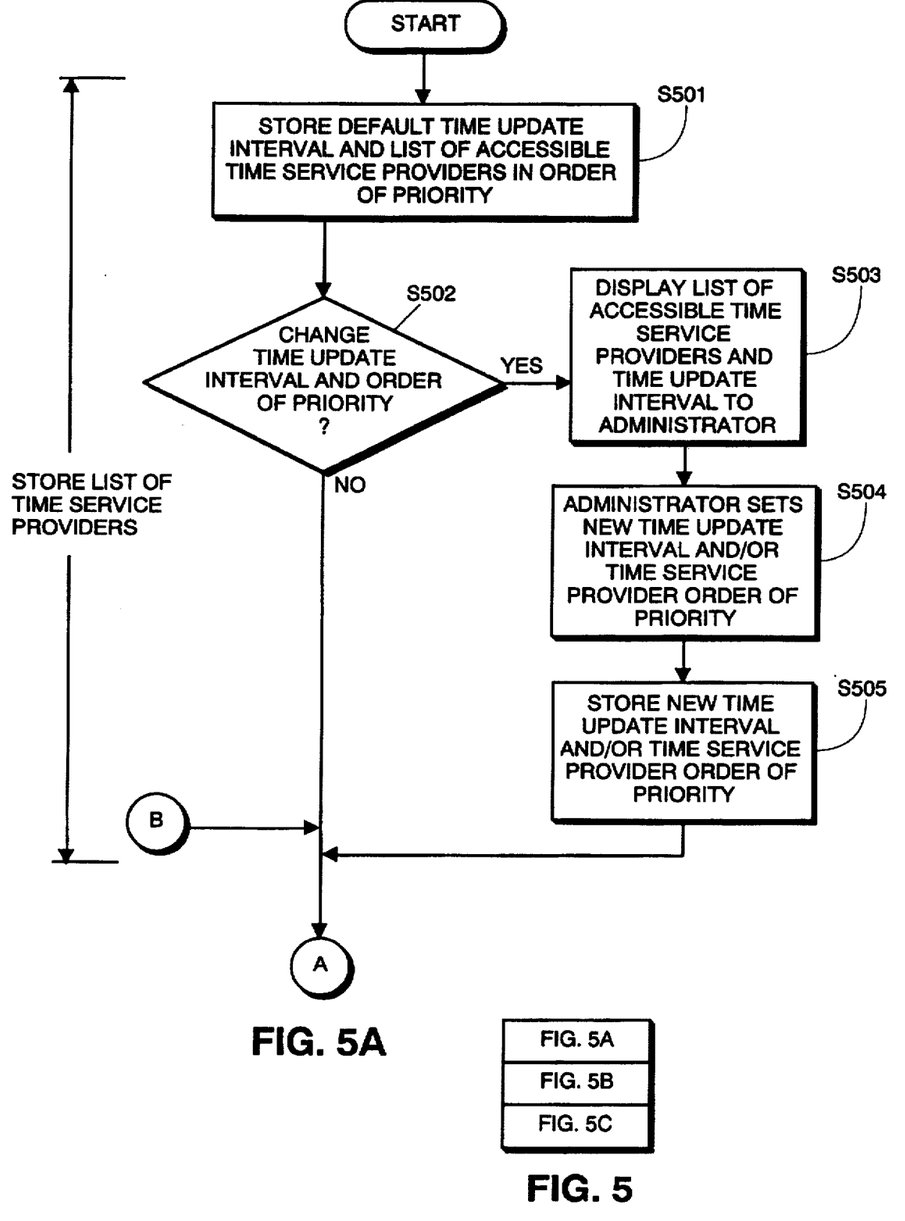
Figure 5B:
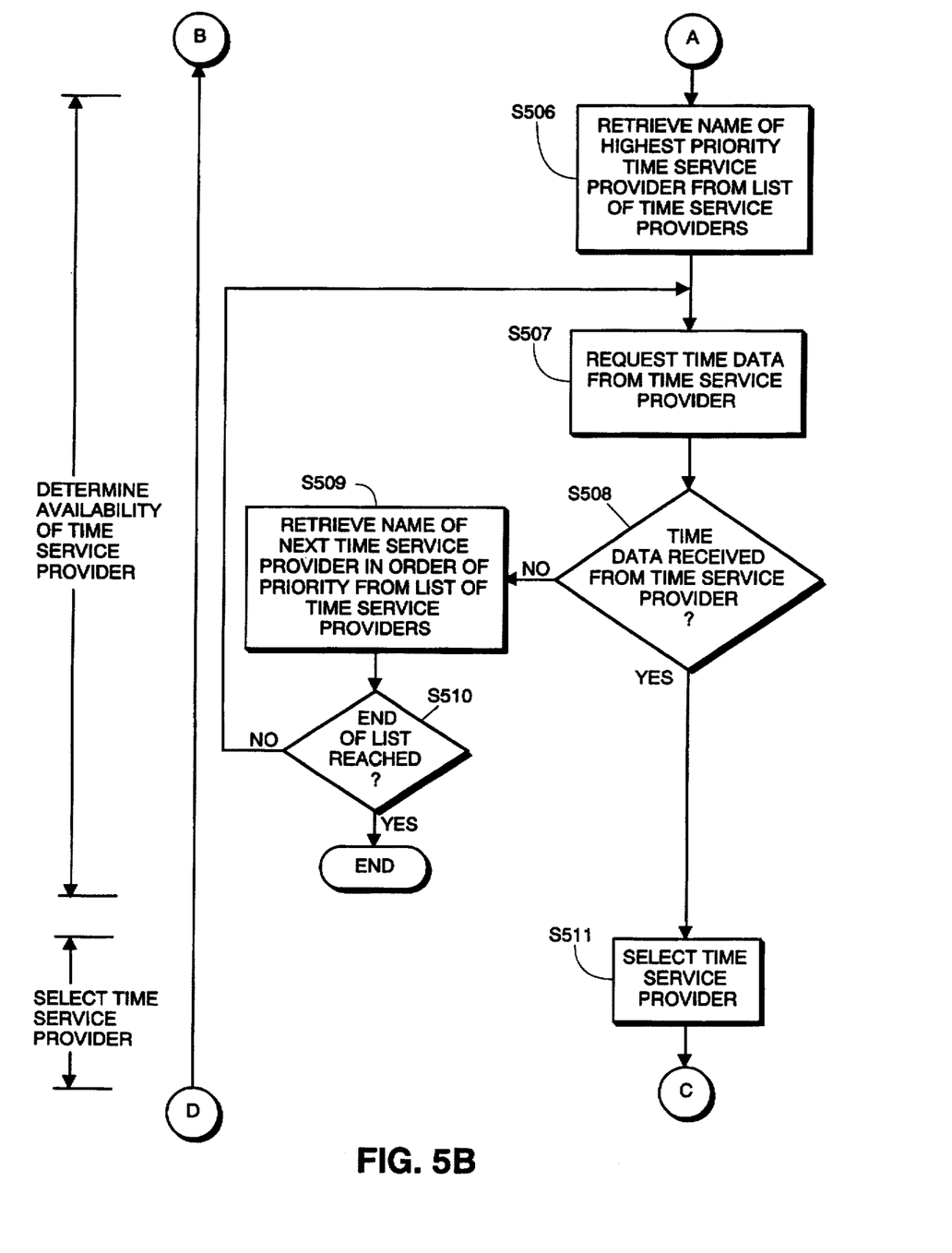
Figure 5C:
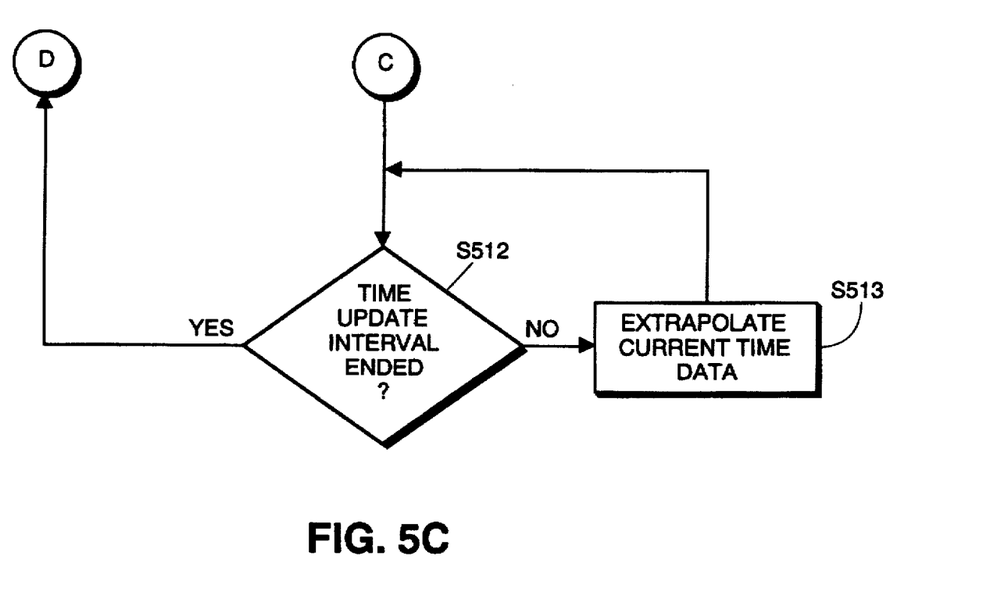

FIG. 5 is a flow diagram which shows process steps of the present invention for selecting a time service provider from a list of plural time service providers accessible on LAN 1. The process steps shown in FIG. 5 are stored in computer-readable media such as in EPROM 42, primarily in CPSOCKET as shown in FIG. 4, and are executed by microprocessor 37 from DRAM 41 after being downloaded from EPROM 42 to DRAM 41.

Briefly, the process steps shown in FIG. 5 define an invention which selects one time service provider from a plurality of time service providers accessible over a local area network (LAN). According to the invention defined by the process steps, a list identifying plural time service providers accessible over the LAN is stored in a memory. The list identifies plural time service providers in order from a highest priority time service provider to a lowest priority time service provider. A highest priority time service provider which is available in the list identifying plural time service providers is determined via a LAN interface, and the highest priority time service provider which is available in the list identifying plural time service providers is selected via the LAN interface.

In more detail, in step S501, a list of plural time service providers accessible to NEB 2 via LAN 1 is stored in NVRAM 40. In the list, the time service providers are ranked from highest-priority time service provider to lowest-priority time service provider. In step S501, a time update interval is also be stored in NVRAM 40. This information stored in step S501 comprises NEB 2 default settings. In a preferred embodiment of the present invention these default settings are 120 seconds for the time update interval and (1) IPX (Novell time service provider 9), (2) TCP/IP (Unix time service provider 14) and (3) AppleTalk (Macintosh time service provider 12) for the list of plural time service providers, the plural time servers being in order of priority from highest priority time service provider (IPX) to lowest priority time service provider (AppleTalk).

In step S502 the network administrator may change the default time update interval or the default order of priority of time service providers in the list of plural time service providers. In a Novell network, this is done via CPNET.

More specifically, to change the time update interval or the order of priority of time service providers on NEB 2, the network administrator issues a command from the network administrator's PC 7. CPNET communicates this command to CPSOCKET which, in step S503, provides CPNET with the list of plural time service providers, and the time update interval stored in NVRAM 40. CPNET receives the time update interval and the list of plural time service providers from CPSOCKET, and displays, to the network administrator, time services information window 52, shown in FIG. 6.

Figure 6:
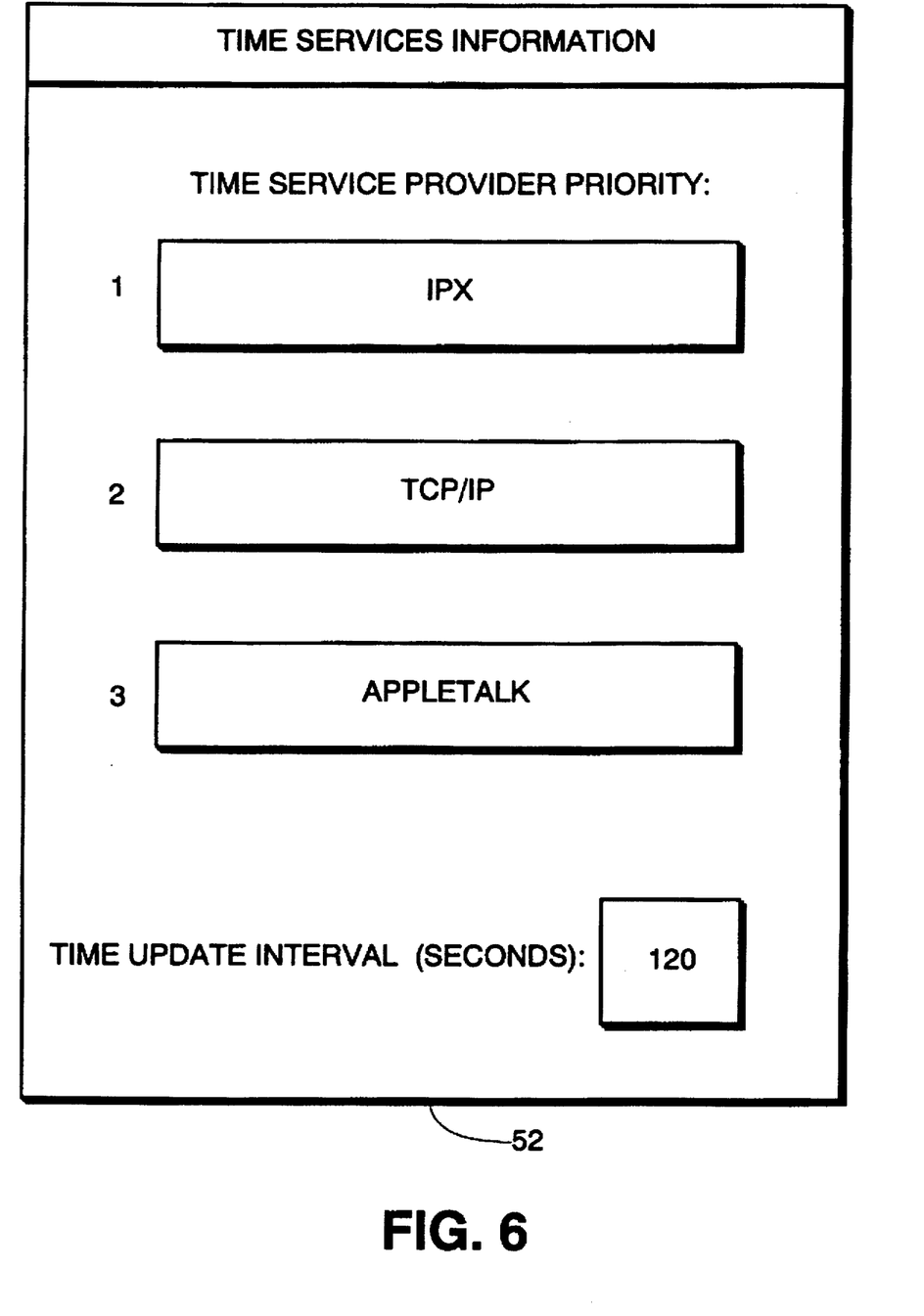
FIG. 6 is a diagram of a time services information window displayed to a network administrator by CPNET, in which the network administrator can change the time service provider order of priority and the time update interval.

Time services information window 52 displays the current time update interval and the list of plural time service providers currently accessible to NEB 2 in sequence from highest-priority time service provider to lowest-priority time service provider. As shown in FIG. 6, each of the plural time service providers is identified by protocol, i.e., IPX, TCP/IP and AppleTalk. It is noted, however, that time services information window 52 may also be configured to display time service providers by name or other identifying characteristic.

It is further noted that while time services information window 52 shows only three time service providers, other time service providers, such as a LAN MANAGER time service provider or secondary time service providers for each protocol, may also be displayed in time services information window 52, in addition to those shown in FIG. 6.

Next, in step S504, the network administrator changes the order of priority of the time service providers and/or the time update interval. This is done via the network administrator's PC 7.

Once the network administrator enters his or her changes in step S504, in step S505, CPNET communicates a newly-set time update interval and/or a newly-set time service provider order of priority to CPSOCKET. CPSOCKET stores this information in NVRAM 40 in place of the default settings stored in step S501.

If, in step S502, the network administrator does not change the default time service provider order of priority or the default time update interval, processing proceeds from step S502 directly to step S506.

In step S506, CPSOCKET retrieves the name (or other identifying characteristic, such as protocol) of the highest priority time service provider from the list of plural time service providers stored in NVRAM 40. As indicated above, in a preferred embodiment of the present invention, this is Novell time service provider 9 (identified as "IPX").

After CPSCOCKET receives the name of the highest priority time service provider in step S506, in step S507, CPSOCKET determines whether that time service provider is available. Availability is determined by issuing a request for time data to the highest priority time service provider. If, within a predetermined period of time, which is less than the time update interval, the highest priority time service provider provides time data, in step S508, CPSOCKET determines that the highest priority time service provider is available.

In the case that the highest priority time service provider is available, processing proceeds directly to step S511, in which CPSOCKET selects the highest priority time service provider and stores the received time data in a memory, such as DRAM 41.

If, however, in step S508, time data is not received from the highest priority time service provider (i.e., from Novell time service provider 9) within the predetermined period of time, CPSOCKET determines that the highest priority time service provider in the list of plural time service providers is unavailable. A time service provider may be unavailable for several reasons. For example, a time service provider may no longer be connected to the network, or may have "went down", meaning that the time service provider is currently inoperable.

If in step S508, CPSOCKET determines that the highest priority time service provider is unavailable, processing proceeds to steps S509. In step S509, CPSOCKET retrieves the name of the time service provider next in priority from the list of plural time service providers stored in NVRAM 40. If, in step S510, CPSOCKET determines that there are no time service providers remaining in the list of plural time service providers, i.e., that the end of the list has been reached, microprocessor 37 extrapolates so as to obtain an estimate of current time. Specifically, if previously-stored time data is available, as would generally be the case except at initial power-up of NEB 2, microprocessor 37 extrapolates current time data from the previously-stored time data.

For example, in a preferred embodiment of the present invention, microprocessor 37 is initialized to issue 18 ticks per second, and to keep track of the total number of ticks issued during each time update interval. To extrapolate time data (in seconds) from previously-stored time data, microprocessor 37 divides the total number of issued ticks by 18. This extrapolated time data is then added to the previously-stored time data to calculate current time data. This current time is then stored in DRAM 41.

If, however, previously-stored time data is unavailable, as would be the case, for example, at initial power-up of NEB 2, NEB 2 will repeat steps S507 to S510 until (1) a time service provider becomes available and transmits time data to NEB 2 or (2) NEB 2 is powered off.

Returning to step S509, if CPSOCKET retrieves a name of a next time service provider from the list of plural time service providers stored in NVRAM 40, step S510 determines that the end of the list of plural time service providers has not been reached, and processing returns to step S507. In the preferred embodiment, the next time service provider in order of priority after Novell time service provider 9 is UNIX time service provider 14. Thus, CPSOCKET determines if this next time service provider is available by requesting time data from UNIX time service provider 14, and processing continues identically to that described above with respect to Novell time service provider 9.

In the preferred embodiment, in the case that UNIX time service provider 14 is unavailable, i.e., UNIX time service provider 14 did not supply time data in response to CPSOCKET's request, processing proceeds to step S509, in which CPSOCKET retrieves the name of the next time service provider in order of priority. In this case, as described above, the time service provider third in order of priority is Macintosh time service provider 12. Thus, CPSOCKET requests time data from Macintosh time service provider 12, and processing continues identically to that described above with respect to Novell time service provider 9.

The foregoing process steps, i.e., steps S507 to S510, are repeated for all time service providers in the list of plural time service providers stored in NVRAM 40 until CPSOCKET determines either that (1) a time service provider is available, in which case processing proceeds to step S511, in which that time service provider is selected, or (2) no time service provider in the list of plural time service providers is available, in which case processing ends and time data is extrapolated, as described above.

As indicated above, once a time service provider is selected and time data has been received in step S508 (or alternatively, time data has been extrapolated), the time data is stored in a memory, such as DRAM 41, and processing proceeds to step S512.

The stored time data is used to keep track of current time during the time update interval. More specifically, during the time update interval, which as indicated above is 120 seconds in the preferred embodiment, microprocessor 37 keeps track of the current time by extrapolating current time data from previously-stored time data. This extrapolation process is done at predetermined time intervals, and is identical to that described above. Therefore a detailed description of extrapolation is omitted here for the sake of brevity.

In step S512, CPSOCKET determines whether the current time update interval has ended. CPSOCKET makes this determination by comparing the extrapolated amount of time since the beginning of the current time update interval to the time update interval stored in NVRAM 40. When CPSOCKET determines that the extrapolated amount of time is less than the time update interval, i.e., that the current time update interval has not ended, processing proceeds to step S513, in which microprocessor 37 continues to extrapolate current time data.

If, however, the amount of extrapolated time data since the beginning of the current time update interval is greater than or equal to the time update interval stored in NVRAM 40, processing proceeds to step S506, whereafter the foregoing process is repeated.

It is noted that although FIG. 5 shows the network administrator changing the time update interval and the order of priority of time service providers prior to step S506, the network administrator is not limited to changing the time update interval or the order of priority of time service providers at this time. Rather the network administrator may change the time update interval and/or the time service provider order of priority at any point during processing. For example, the network administrator can change either of these settings during the time update interval. In such a case, processing proceeds to step S503, whereafter processing proceeds as described in detail above.

It is further noted that while the present invention has been described with respect to a heterogeneous network, the present invention can also be used in connection with a homogeneous network, i.e., a network which runs only one protocol, so long as there are multiple time service providers.

The invention has been described with respect to a particular illustrative embodiment. It is to be understood that the invention is not limited to the above-described embodiment and that various changes and modifications may be made by those of ordinary skill in the art without departing from the spirit and scope of the invention.

What is claimed is:

1. A method of selecting one time service provider from a plurality of time service providers accessible over a local area network (LAN), said method comprising:

a storing step which stores, in a memory, a list identifying plural time service providers accessible over the LAN, the list identifying plural time service providers in order from a highest priority time service provider to a lowest priority time service provider;

a determining step which determines, via a LAN interface, a first available time service provider in the list identifying plural time service providers, the determining step traversing the list of time service providers starting at the highest priority time service provider in the list, checking each successive time service provider for availability by requesting time data therefrom, and stopping at the first time service provider which provides time data; and a selecting step which selects, via the LAN interface, the first available time service provider in the list identifying plural time service providers.

2. A method according to claim 1, wherein said selecting step comprises receiving time data, via the LAN interface, from the selected time service provider; and further comprising:

a second storing step which stores the time data received from the selected time service provider.

3. A method according to claim 1, wherein said determining step and said selecting step are repeated at predetermined time intervals; and wherein said determining step determines whether a time service provider is available based on whether the time service provider responds to a request for time data.

4. A method according to claim 3, further comprising:

an extrapolating step which, during the predetermined time intervals, extrapolates time data from previously-received time data; and a second storing step which stores the extrapolated time data.

5. A method according to claim 4, further comprising:

a receiving step which, prior to said storing step, receives the predetermined time intervals over the LAN interface from a remote network node;

wherein said storing step comprises storing the predetermined time intervals received over the LAN interface from the remote network node.

6. A method according to claim 1, wherein in the case that said determining step determines that all time service providers in the list identifying plural time service providers are unavailable, said method further comprising:

an extrapolating step which extrapolates time data from previously-received time data; and a second storing step which stores the extrapolated time data.

7. A method according to claim 1, wherein the LAN is a LAN which runs plural protocols;

wherein the list identifying plural time service providers accessible over the LAN includes at least a first time service provider for a first protocol, a second time service provider for a second protocol and a third time service provider for a third protocol, the first time service provider being the highest priority time service provider, the second time service provider being the next highest priority time service provider, and the third time service provider being the lowest priority time service provider; and wherein said determining step comprises (a) requesting, via the LAN interface, time data from the first time service provider in the list identifying plural time service providers using the first protocol, and, in a case that time data is not received from the first time service provider within a predetermined period of time, (b) requesting, via the LAN interface, time data from the second time service provider in the list identifying plural time service providers using the second protocol, and, in a case that time data is not received from the second time service provider within a predetermined period of time, (c) requesting, via the LAN interface, time data from the third time service provider in the list identifying plural time service providers using the third protocol, and, in a case that time data is not received from the third time service provider within a predetermined period of time, (d) repeating said determining step until time data is received from a time service provider.

8. A method according to claim 1, further comprising:

a receiving step which, prior to said storing step, receives an order of priority of time service providers via the LAN interface from a remote network node;

wherein said storing step comprises storing the order of priority of time service providers received via the LAN interface from the remote network node as the list of plural time service providers accessible over the LAN.

9. A network device which interfaces to a local area network (LAN) over which plural time service providers are accessible, each time service provider for providing time data to said network device upon request, said network device comprising:

a memory which stores a list identifying plural time service providers accessible over the LAN, the list identifying plural time service providers in order from a highest priority time service provider to a lowest priority time service provider;

a LAN interface which interfaces to the LAN, over which an available time service provider is determined and over which the available time service provider is selected; and a processor which (a) determines, via said LAN interface, a first available time service provider in the list identifying plural time service providers, and (b) selects, via said LAN interface, the first available time service provider in the list identifying plural time service providers, the processor determining the first available time service provider by traversing the list of time service providers starting at the highest priority time service provider in the list, checking each successive time service provider for availability by requesting time data therefrom, and stopping at the first time service provider which provides time data.

10. A network device according to claim 9, wherein said processor selects a time service provider by receiving time data, via the LAN interface, from the selected time service provider; and wherein said processor stores the time data received from the selected time service provider in a memory.

11. A network device according to claim 9, wherein the determining step and the selecting step performed by said processor are repeated by said processor at predetermined time intervals; and wherein said processor determines whether a time service provider is available based on whether the time service provider responds to a request for time data.

12. A network device according to claim 11, wherein said processor, during the predetermined time intervals, extrapolates time data from previously-received time data; and wherein said processor stores the extrapolated time data in a memory.

13. A network device according to claim 12, wherein said processor (a) receives the predetermined time intervals from a network node over said LAN interface, and (b) stores the predetermined time intervals received over said LAN interface from the remote network node.

14. A network device according to claim 9, wherein in the case that said processor determines that all time service providers in the list identifying plural time service providers are unavailable, said processor extrapolates time data from previously-received time data and stores the extrapolated time data in a memory.

15. A method according to claim 11, wherein the LAN is a LAN which runs plural protocols;

wherein the list identifying plural time service providers includes at least a first time service provider for a first protocol, a second time service provider for a second protocol and a third time service provider for a third protocol, the first time service provider being the highest priority time service provider, the second time service provider being the next highest priority time service provider, and the third time service provider being the lowest priority time service provider; and wherein said processor determines an available time service provider by (a) requesting, via said LAN interface, time data from the first time service provider in the list identifying plural time service providers using the first protocol, and, in a case that time data is not received from the first time service provider within a predetermined period of time, (b) requesting, via said LAN interface, time data from the second time service provider in the list identifying plural time service providers using the second protocol, and, in a case that time data is not received from the second time service provider within a predetermined period of time, (c) requesting, via said LAN interface, time data from the third time service provider in the list identifying plural time service providers using the third protocol, and, in a case that time data is not received from the third time service provider within a predetermined period of time, (d) repeating determining an available time service provider until time data is received from a time service provider.

16. A network device according to claim 9, wherein said processor (a) receives, via said LAN interface, an order of priority of time service providers from a remote network node, and (b) stores the order of priority of time service providers received via said LAN interface from the remote network node as the list of plural time service providers accessible over the LAN in said memory.

17. Computer-executable process steps stored on a computer-readable medium, said computer-executable process steps for selecting one time service provider from a plurality of time service providers accessible over a local area network (LAN), said computer-executable process steps comprising:

a storing step which stores, in a memory, a list identifying plural time service providers accessible over the LAN, the list identifying plural time service providers in order from a highest priority time service provider to a lowest priority time service provider;

a determining step which determines, via a LAN interface, a first available time service provider in the list identifying plural time service providers, the determining step traversing the list of time service providers, starting at the highest priority time service provider in the list, checking each successive time service provider for availability by requesting time data therefrom, and stopping at the first time service provider which provides time data; and a selecting step which selects, via the LAN interface, the first available time service provider in the list identifying plural time service providers.

18. Computer-executable process steps according to claim 17, wherein said selecting step comprises receiving time data, via the LAN interface, from the selected time service provider; and further comprising:

a second storing step which stores the time data received from the selected time service provider.

19. Computer-executable process steps according to claim 17, wherein said determining step and said selecting step are repeated at predetermined time intervals; and wherein said determining step determines whether a time service provider is available based on whether the time service provider responds to a request for time data.

20. Computer-executable process steps according to claim 19, further comprising:

an extrapolating step which, during the predetermined time intervals, extrapolates time data from previously-received time data; and a second storing step which stores the extrapolated time data.

21. Computer-executable process steps according to claim 20, further comprising:

a receiving step which, prior to said storing step, receives the predetermined time intervals via the LAN interface from a remote network node;

wherein said storing step comprises storing the predetermined time intervals received from the remote network node.

22. Computer-executable process steps according to claim 17, wherein in the case that said determining step determines that all time service providers in the list identifying plural time service providers are unavailable, said method further comprising:

an extrapolating step which extrapolates time data from previously-received time data; and a second storing step which stores the extrapolated time data.

23. Computer-executable process steps according to claim 17, wherein the LAN is a LAN which runs plural protocols;

wherein the list identifying plural time service providers accessible over the LAN includes at least a first time service provider for a first protocol, a second time service provider for a second protocol and a third time service provider for a third protocol, the first time service provider being the highest priority time service provider, the second time service provider being the next highest priority time service provider, and the third time service provider being the lowest priority time service provider; and wherein said determining step comprises (a) requesting, via the LAN interface, time data from the first time service provider in the list identifying plural time service providers using the first protocol, and, in a case that time data is not received from the first time service provider within a predetermined period of time, (b) requesting, via the LAN interface, time data from the second time service provider in the list identifying plural time service providers using the second protocol, and, in a case that time data is not received from the second time service provider within a predetermined period of time, (c) requesting, via the LAN interface, time data from the third time service provider in the list identifying plural time service providers using the third protocol, and, in a case that time data is not received from the third time service provider within a predetermined period of time, (d) repeating said determining step until time data is received from a time service provider.

24. Computer-executable process steps according to claim 17, further comprising:

a receiving step which, prior to said storing step, receives an order of priority of time service providers via the LAN interface from a remote network node;

wherein said storing step comprises storing the order of priority of time service providers received via the LAN interface from the remote network node as the list of plural time service providers accessible over the LAN.

25. A network device which interfaces a local area network (LAN) to a peripheral, and which receives print jobs over the LAN, logs the print jobs, and communicates the print jobs to the peripheral, said network device comprising:

a memory which stores a list identifying plural time service providers accessible over the LAN, the list identifying plural time service providers in order from a highest priority time service provider to a lowest priority time service provider;

a LAN interface which interfaces to the LAN, over which requests for time data are communicated to a time service provider, over which time data from a currently-available time service provider is received, and over which print jobs are received;

a peripheral interface which interfaces to the peripheral, over which print jobs are transmitted, and over which peripheral information is received; and a processor which (a) determines a first available time service provider in the list identifying plural time service providers by traversing the list of time service providers starting at the highest priority time service provider in the list, checking each successive time service provider for availability by requesting time data therefrom, and stopping at the first time service provider which provides time data, (b) receives time data from the first available time service provider in the list identifying plural time service providers, (c) extrapolates current time data based on the received time data, (d) receives a print job via said LAN interface, (e) communicates the print job to the peripheral via said peripheral interface, (f) logs, in a log file, the print job and time data corresponding to a time that the print job is communicated to the peripheral, (g) receives, via said peripheral interface, a signal indicating that the print job communicated to the peripheral has finished printing, and (h) logs, in the log file, the print job and time data corresponding to the time that the signal indicating that the print job communicated to the peripheral has finished printing is received.

* * * * *